US009281744B2

(12) United States Patent
Kropfitsch

(10) Patent No.: US 9,281,744 B2
(45) Date of Patent: Mar. 8, 2016

(54) SYSTEM AND METHOD FOR A PROGRAMMABLE VOLTAGE SOURCE

(75) Inventor: Michael Kropfitsch, Koettmannsdorf (AT)

(73) Assignee: Infineon Technologies AG, Neubiberg (DE)

( * ) Notice: Subject to any disclaimer, the term of this patent is extended or adjusted under 35 U.S.C. 154(b) by 741 days.

(21) Appl. No.: 13/460,025

(22) Filed: Apr. 30, 2012

(65) Prior Publication Data

US 2013/0287231 A1    Oct. 31, 2013

(51) Int. Cl.
*H04R 3/00* (2006.01)
*H02M 3/07* (2006.01)

(52) U.S. Cl.
CPC .................... *H02M 3/073* (2013.01)

(58) Field of Classification Search
CPC ........... H04R 3/00; H04R 19/04; H04R 19/00
USPC ........... 381/111, 113–114, 174, 127; 327/536
See application file for complete search history.

(56) References Cited

U.S. PATENT DOCUMENTS

| | | | |
|---|---|---|---|
| 5,399,989 | A | 3/1995 | Chern |
| 5,719,528 | A * | 2/1998 | Rasmussen et al. ............ 330/10 |
| 6,002,599 | A | 12/1999 | Chow |
| 6,157,242 | A | 12/2000 | Fukui |
| 6,160,440 | A | 12/2000 | Javanifard et al. |
| 6,483,728 | B1 | 11/2002 | Johnson et al. |
| 7,548,626 | B2 | 6/2009 | Stenberg et al. |
| 8,004,350 | B2 | 8/2011 | Draxelmayr |
| 8,067,958 | B2 | 11/2011 | Draxelmayr |
| 8,750,539 | B2 * | 6/2014 | Pennock ............... H02M 3/073 330/297 |
| 2002/0039463 | A1 | 4/2002 | Degertekin et al. |
| 2003/0155966 | A1 | 8/2003 | Harrison |
| 2005/0174162 | A1 | 8/2005 | Cheng et al. |
| 2005/0219953 | A1 | 10/2005 | Bayram et al. |
| 2006/0083392 | A1 | 4/2006 | Akino |
| 2007/0096801 | A1 * | 5/2007 | Shimizu .......................... 330/10 |
| 2008/0075306 | A1 | 3/2008 | Poulsen et al. |
| 2009/0003629 | A1 | 1/2009 | Shajaan et al. |
| 2009/0134501 | A1 | 5/2009 | Ganitzer et al. |
| 2011/0056302 | A1 | 3/2011 | Lutz |

(Continued)

FOREIGN PATENT DOCUMENTS

| | | |
|---|---|---|
| CN | 1334935 A | 2/2002 |
| CN | 1655431 A | 8/2005 |

(Continued)

OTHER PUBLICATIONS

Harrison, R. R., et al., "A Low-Power Low Noise CMOS Amplifier for Neural Recording Applications," IEEE Journal of Solid-State Circuits, Jun. 2003, pp. 958-965, vol. 38, No. 6.

(Continued)

*Primary Examiner* — Disler Paul
(74) *Attorney, Agent, or Firm* — Slater & Matsil, L.L.P.

(57) ABSTRACT

In accordance with an embodiment, a method of operating a charge pump includes providing a first programmable voltage to a plurality of clock generators having outputs coupled to first nodes of corresponding groups of charge pump capacitors, and selecting a second node of one capacitor from one of the corresponding groups of charge pump capacitors. The clock generators produce a plurality of clock signals having amplitudes proportional to the first programmable voltage.

21 Claims, 10 Drawing Sheets

(56) References Cited

U.S. PATENT DOCUMENTS

| | | | |
|---|---|---|---|
| 2011/0080198 A1* | 4/2011 | Ohta | H02M 3/073 327/157 |
| 2011/0142261 A1 | 6/2011 | Josefsson | |
| 2011/0150243 A1 | 6/2011 | Onishi | |
| 2011/0175243 A1 | 7/2011 | Jo et al. | |
| 2012/0300552 A1* | 11/2012 | Neto et al. | 365/185.18 |
| 2013/0015919 A1 | 1/2013 | Kropfitsch et al. | |
| 2013/0051582 A1 | 2/2013 | Kropfitsch et al. | |
| 2013/0129116 A1 | 5/2013 | Kropfitsch et al. | |
| 2013/0136267 A1 | 5/2013 | Hammerschmidt et al. | |
| 2013/0271307 A1 | 10/2013 | Kropfitsch et al. | |

FOREIGN PATENT DOCUMENTS

| | | |
|---|---|---|
| DE | 20 2011 106 756 | 4/2012 |
| EP | 1 906 704 | 4/2008 |
| EP | 2223654 A1 | 9/2010 |
| EP | 2549643 A1 | 1/2013 |
| EP | 2653846 A1 | 10/2013 |
| JP | 3580693 B2 | 10/2004 |
| WO | 2009135815 A1 | 11/2009 |
| WO | WO-2009/135815 A1 | 11/2009 |

OTHER PUBLICATIONS

Delbruek, T., et al., "Analog VLSI Adaptive, Logarithmic, Wide-Dynamic-Range Photoreceptor," 4 pages; 1994.

Vittoz, E., et al., "CMOS Analog Integrated Circuits Based on Weak Inversion Operation," IEEE Journal of Solid-State Circuits, vol. Sc-12, No. 3, Jun. 1977, pp. 224-231.

Harrison, R.R., "Integrated Circuits for Neural Interfacing," Circuits for Emerging Technologies, Feb. 15, 2008, pp. 1-12.

Feng, P., et al., "History of the High-Voltage Charge Pump," Book Excerpt, Nov. 2006, pp. 1-9, Chapter 1, Professional Engineering 6×9, Charge Pump Circuit Design.

Oralkan, O., et al., "Experimental Characterization of Collapse-Mode CMUT Operation," IEEE Transactions on Ultrasonics, Ferroelectrics, and Frequency Control, Aug. 2006, 1513-1523, vol. 53, No. 8.

Dickson, J. F, "On-Chip High-Voltage Generation in MNOS Integrated Circuits Using an Improved Voltage Multiplier Technique," IEEE Journal of Solid-State Circuits, vol. SC-11, No. 3, Jun. 1976, pp. 374-378.

* cited by examiner

SYSTEM AND METHOD FOR A PROGRAMMABLE VOLTAGE SOURCE

TECHNICAL FIELD

This invention relates generally to semiconductor circuits and methods, and more particularly to a system and method for a programmable voltage source.

BACKGROUND

Audio microphones are commonly used in a variety of consumer applications such as cellular telephones, digital audio recorders, personal computers and teleconferencing systems. In particular, lower-cost electret condenser microphones (ECM) are used in mass produced cost sensitive applications. An ECM microphone typically includes a film of electret material that is mounted in a small package having a sound port and electrical output terminals. The electret material is adhered to a diaphragm or makes up the diaphragm itself. Most ECM microphones also include a preamplifier that can be interfaced to an audio front-end amplifier within a target application such as a cell phone. Another type of microphone is a microelectro-mechanical Systems (MEMS) microphone, which can be implemented as a pressure sensitive diaphragm is etched directly onto an integrated circuit.

Environmental sound pressure levels span a very large dynamic range. For example, the threshold of human hearing is at about 0 dBSPL, conversational speech is at about 60 dBSPL, while the sound of a jet aircraft 50 m away is about 140 dBSPL. While the diaphragm of a microphone, such as a MEMS microphone, may be able to withstand high intensity acoustic signals and faithfully convert these high intensity acoustic signals into an electronic signal, dealing with such high-level signals poses some difficulties. For example, many amplifiers and preamplifiers for acoustic microphones are optimized for a particular dynamic range. As such, these systems may not be able to handle the full audio range without adding significant distortion.

SUMMARY OF THE INVENTION

In accordance with an embodiment, a method of operating a charge pump includes providing a first programmable voltage to a plurality of clock generators having outputs coupled to first nodes of corresponding groups of charge pump capacitors, and selecting a second node of one capacitor from one of the corresponding groups of charge pump capacitors. The clock generators produce a plurality of clock signals having amplitudes proportional to the first programmable voltage.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to embodiments in a specific context, namely programmable voltage source for a bias generator that may be used with a capacitive signal source such as a MEMS or an electret condenser microphone (ECM). The invention may also be applied, however, to other types of circuits and systems, such as audio systems, communication systems, sensor systems and other systems that use a programmable voltage source for providing, for example, a bias voltage.

Figure 1A:
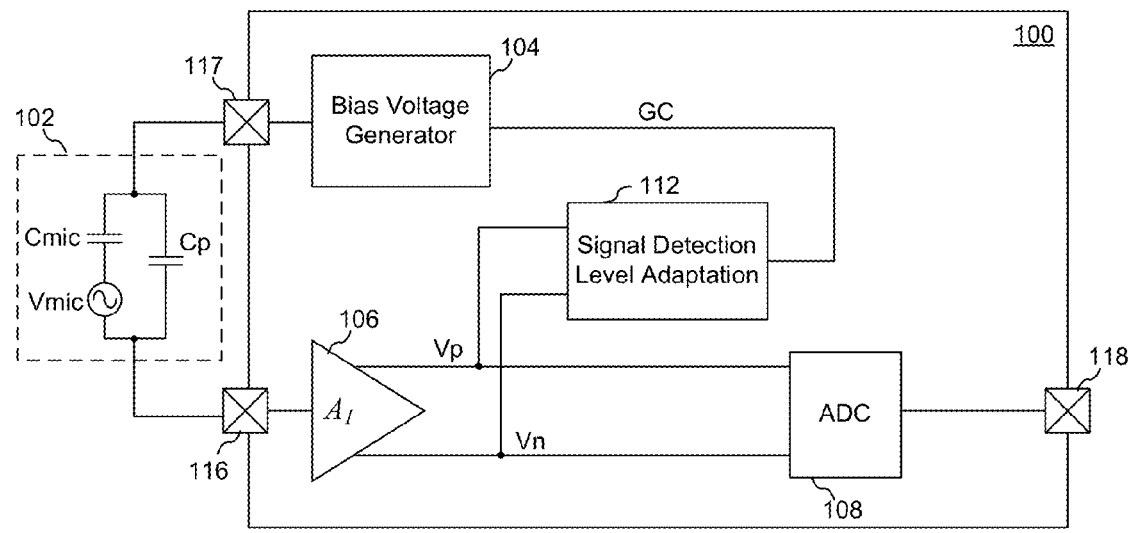
FIGS. 1a-b illustrate block diagrams of a microphone interface system according to an embodiment of the present invention.

FIG. 1a illustrates embodiment amplifier integrated circuit (IC) 100 configured to be coupled to MEMS microphone 102, which is shown in dotted lines to indicate that microphone 102 is not necessarily included on IC 100. In some embodiments, microphone 102 may also be included on IC 100 or on a separate die housed within the same package. In alternative embodiments, other microphone types, such as ECM microphones, or other types of capacitive sensor circuits may be used in place of MEMS microphone 102.

IC 100 has variable gain amplifier 106, analog to digital converter (A/D) 108, signal detection and level adaptation block 112, and adjustable bias generator 104. Amplifier 106 has one or more stages that amplify the output of MEMS microphone 102, which is coupled to IC 100 via input pad 116. In some embodiments, portions of amplifier 106 may be implemented, for example, as described in co-pending application Ser. No. 13/183,193, entitled System and Method for Capacitive Signal Source Amplifier, filed on Jul. 14, 2011, which application has been incorporated by reference herein in its entirety. Alternatively, variable gain amplifier 106 may be implemented according to techniques known in the art. Amplifier 106 may also be implemented as a variable gain amplifier whose gain is controlled by signal detection and adaptation block 112. In an embodiment, ADC 108 outputs a digital representation of the signal output of amplifier 106. This digital representation may be in the form of a digital word, a bitstream, or a pulse width modulated representation of the microphone signal at output pad 118, as described in co-pending application Ser. No. 13/447,792, entitled System and Method for High Input Capacitive Signal Amplifier, filed on Apr. 16, 2012, which application has been incorporated by reference herein in its entirety. Alternatively, an analog representation of the microphone signal may be coupled to output pad 118.

In some embodiments that utilize a MEMS microphone, bias generator 104 provides a bias voltage for microphone 102 itself at pin 117. This bias voltage may be between about 3V and about 16V depending on the particular microphone and system implementation. Alternatively, other voltage ranges may be used.

In an embodiment, signal detection and level adaptation block 112 measures an amplitude at the output of variable gain amplifier 106, and calculates gain control signal GC as a function of the measured amplitude. Gain control signal GC controls bias generator 104 that provides a bias voltage to MEMS microphone 102 that is coupled to amplifier 106. In some embodiments, the gain of MEMS microphone 102 is proportional to the provided bias voltage. By varying the bias voltage in response to the detected signal voltage, the sensitivity of the capacitive sensor is changed, which results in changing the signal level at the input to amplifier 106. It should be further appreciated that the components on IC 100 may be implemented using more than one component and/or more than one IC in alternative embodiments.

Figure 1B:
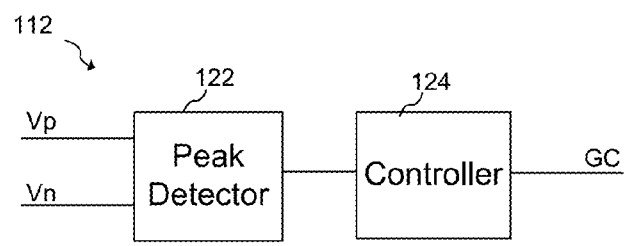

FIG. 1b illustrates an embodiment implementation of signal detection and level adaptation block 112. Peak detector 122 detects peak signals at the output of amplifier 106 and controller 124 controls the gain of the system via gain control signal GC and bias generator 104 according to the output of peak detector 122. In some embodiments, the implementation of peak detection block 122 and controller 124 may be implemented, for example, as described in co-pending application Ser. No. 13/217,890, entitled System and Method for Low Distortion Capacitive Signal Source Amplifier, filed on Aug. 25, 2011, which application is incorporated by reference herein in its entirety.

Figure 2A:
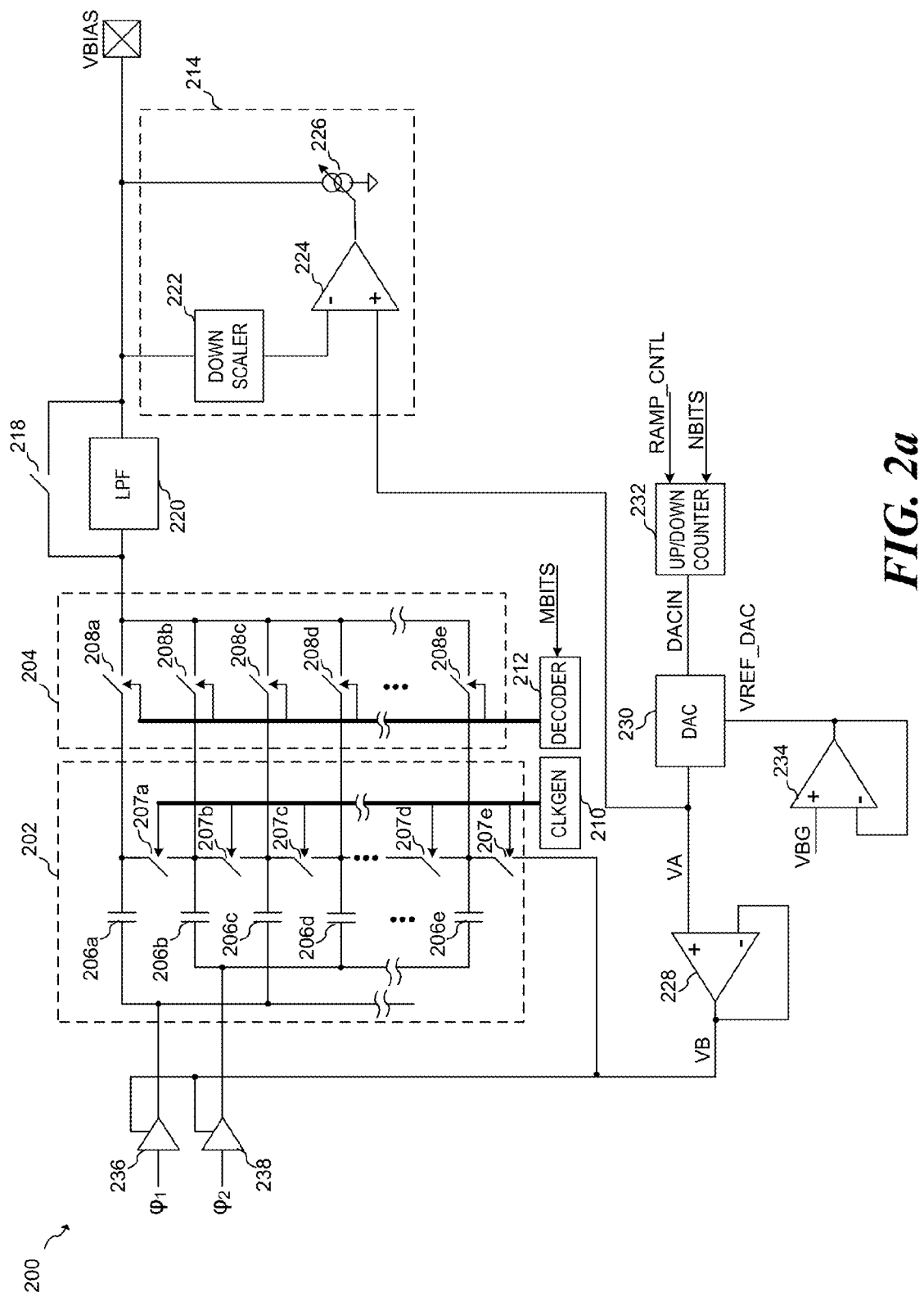
FIGS. 2a-c illustrate an embodiment voltage generator and a corresponding waveform diagram.

FIG. 2a illustrates embodiment controllable voltage source 200 that may be used to implement bias voltage generator 104 (FIG. 1a). Controllable voltage source 200 produces bias voltage VBIAS via charge pump 202. Charge pump 202 includes a plurality of voltage boosting capacitors 206a to 206e and switches 207a to 207e arranged in a Dickson charge pump configuration. Boosting capacitors 206a to 206e are divided into two groups: one group having a first node coupled to driver circuit 236, and another group having a first node coupled to driver circuit 238. During operation of the charge pump driver circuits 236 and 238, respective nodes of the first and second capacitor groups are driven in an alternating manner, while switches 207a to 207e are operated as functional diodes to produce a boosted voltage at VBIAS. In embodiments using switches instead of actual diodes, voltage boosting may be effected without producing voltage drops about 0.6V per stage. In alternative embodiments, switches 207a to 207e may be replaced with actual diodes. Clock generator 210 produces clock signals that activate switches 207a to 207e and driver circuits 236 and 238. In some embodiments, clock generator 210 produces non-overlapping clock phases. While charge pump 202 is shown having five capacitor stages, any number of capacitor and switching stages may be included in embodiments of the present invention according to system's particular requirements and specifications.

In an embodiment, voltage VBIAS may be adjusted in a number ways to achieve coarse and fine voltage control. Coarse voltage control may be achieved by selectively coupling charge pump stages to output node VBIAS via switching network 204, which includes switches 208a to 208e corresponding to individual stages of charge pump 202. In some embodiments, switching network 204 includes a switch for each corresponding stage of charge pump 202. Alternatively, a subset of stages in charge pump 202 may have a corresponding switch in switching network 204. The state of the switches within switching network 204 may be controlled by decoder 212 based on M-bit digital input MBITS. In one embodiment, digital input MBITS is three bits wide resulting in eight coarse voltage steps. Alternatively greater or fewer bits may be used for decoder 212.

Fine voltage control may be achieved by varying the drive voltage of driver circuits 236 and 238. In an embodiment, digital to analog converter (DAC) 230 produces voltage VA in response to digital input word DACIN. Voltage VA may be buffered using amplifier 228 to produce voltage VB, which is coupled to supply inputs of drivers 236 and 238 as well as to the first stage of charge pump 202 at switch 207e. Amplifier 228 provides a low impedance drive to charge pump 202 and help prevent noise and disturbances generated by charge pump 202 from coupling back in to DAC 230. In some embodiments, amplifier 228 may be implemented with a rail-to-rail amplifier in order to cover a larger dynamic range and/or accommodate DAC architectures that provide a large output range. By varying VB, the voltage seen at each stage of the charge pump may be adjusted according to:

$$VBIAS = X * VB,$$

where X represents the number of stages in charge pump 202. It should be appreciated that this relationship may be approximate due to parasitic losses within charge pump 202. In an embodiment, the digital input word used to set voltage VBIAS may be arranged in in two parts. In one embodiment, the first M bits of the digital input work define the coarse voltage setting and the next N bits define the fine voltage setting. Alternatively, fine and coarse control bit may be allocated differently.

Further control of voltage VBIAS may also be achieved by impedance adjustment circuit 214. In an embodiment, impedance adjustment circuit 214 includes variable current source 226, downscaling circuit 222, and error amplifier 224. Error amplifier 224 compares DAC 230 output voltage VA with a downscaled version of the bias, and adjusts the current of current source 226 to minimize the error between the output of downscaling circuit 222 and voltage VA. The use of impedance adjustment circuit 214 may be omitted in some embodiments.

In embodiments, the output voltage range of signal VBIAS may be programmed from between about 2.5 V to about 19 V. Coarse tuning steps may vary from about 0.5 V to up to 3 to 4 V depending on the application and its specifications; however, coarse tuning steps outside of this range may also be used. The fine tuning range between each of the coarse tuning steps is determined by the number of bits of resolution of DAC 230. In one embodiment, DAC 230 is a six bit DAC, in which case each coarse tuning step is divided by $2^6$ or 64 steps. It should be understood that, in alternative embodiments, the output voltage range of VBIAS, as well as the coarse and fine adjustment resolutions may vary from what is described herein. For example, output voltages of greater than 19 V and less than 2.5 V may be achievable. In some embodiments, negative output voltages may be produced using a negative voltage charge pump.

DAC 230 may be implemented using a variety of known architectures. In some embodiments, DAC 230 produces output voltage VA based on reference voltage VREF_DAC, which may be generated using a bandgap voltage or using other voltage reference generation techniques. In the illustrated embodiment, bandgap voltage VBG is buffered by amplifier 234 to provide a low impedance output at VREF_DAC and to prevent switching disturbances from coupling back into the voltage generation circuit.

Up/down counter 232 may be provided between N-bit digital word NBITS and DAC input DACIN in order to provide a smooth transition from one output voltage setting to the next. Signal RAMP_CONTROL determines whether counter 232 increments or decrements. In some embodiments, coarse setting MBITS may be sequenced along with the fine setting control NBITS and RAMP_CNTL in order to ensure a smooth transition between coarse settings. Alternatively, up/down counter 232 may be omitted.

In an embodiment, a low pass filter 220, which has a corner frequency in the mHz to Hz range, may be bypassed via switch 218 during a change in attenuator setting. Bypassing low pass filter 220 allows a change in voltage at VBIAS to settle quickly during a change in setting. This feature may be used, for example, to allow a bias change of microphone 102 to settle quickly after a change in bias. Alternatively low pass filter, 220 and/or switch 218 may be omitted in some embodiments.

Figure 2B:
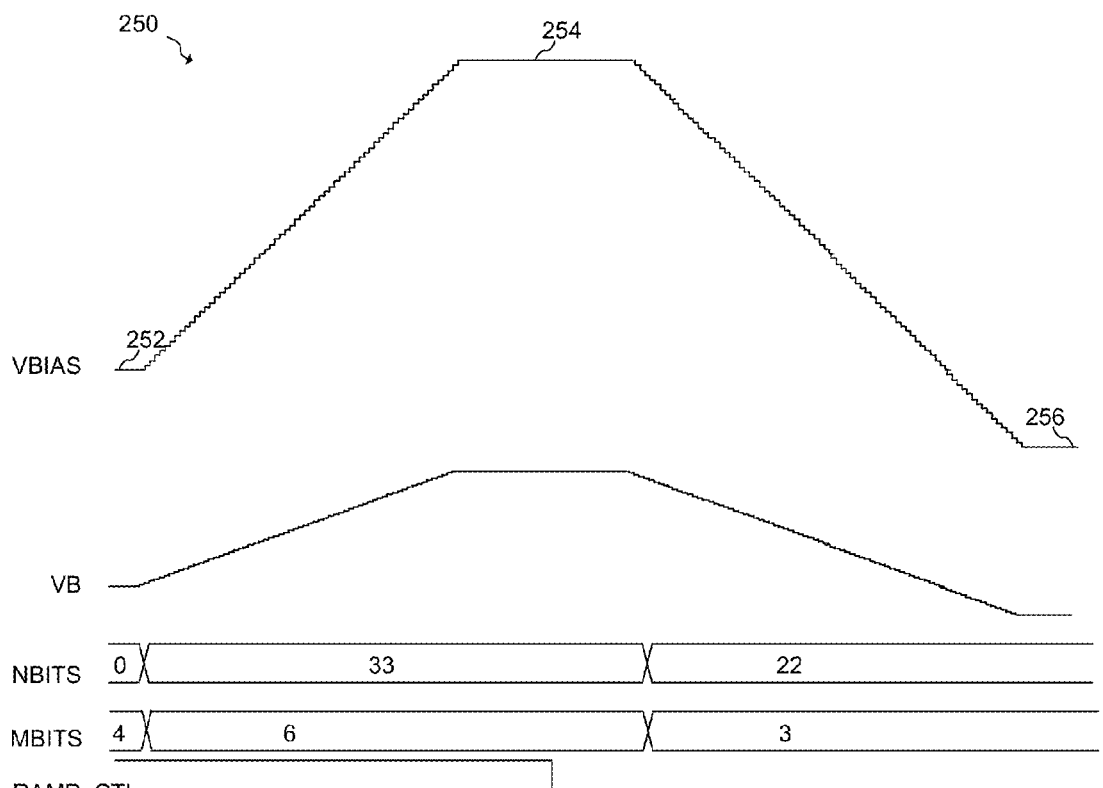

FIG. 2b illustrates example waveform diagrams 250 illustrating the operation of controllable voltage source 200. In the illustrated example control signals NBITS, MBITS and RAMP_CNTL are asserted such that output voltage VBIAS starts at initial voltage 252 corresponding to MBITS=4 and NBITS=0, and ramps up to a second voltage 254 corresponding to MBITS=6 and NBITS=33. Next, RAMP_CNTL is changed from a logic HIGH to a logic LOW, course control MBITS is set to 3, and fine control NBITS is set to 22, thereby causing buffered DAC voltage VB and VBIAS to decrease in a stepwise manner to a third voltage 256. In an embodiment, the voltage steps between the stages are not constant. In first order, the voltage step at the output may be approximated by:

$$VBIAS = Vref\_DAC*(M+1)/(2^N),$$

where M is the number of stages in charge pump and N is the bit resolution of the DAC. In some embodiments, the MBIT setting may be held constant for each voltage output setting when a ramp is applied. Using a ramped output of VBIAS may be applied to such systems as those described in co-pending application Ser. No. 13/299,098, entitled Glitch Detection and Method for Detecting a Glitch, filed on Nov. 17, 2011, which application has been incorporated by reference herein in its entirety. In such an application, the ramp is generated up to a maximum DAC value and automatically stopped when the sensor plates collapse, as sensed by a pull-in detector. Alternatively, VBIAS may be increased using other functions besides ramp functions, such as an exponential function, which may be generated, for example, by changing the values of MBIT and NBIT during output voltage transitions. In an embodiment, the maximum DAC output voltage is about 150 mV below the local supply voltage and the minimum DAC output voltage is about 150 mV. The DAC output voltage range, in one example, may be between about 150 mV and about 1.2 V assuming a nominal supply voltage of about 1.35 V. It should be understood, however, that the DAC output range may vary according to the particular embodiment's supply voltage range, DAC architecture, and specifications.

Figure 2C:
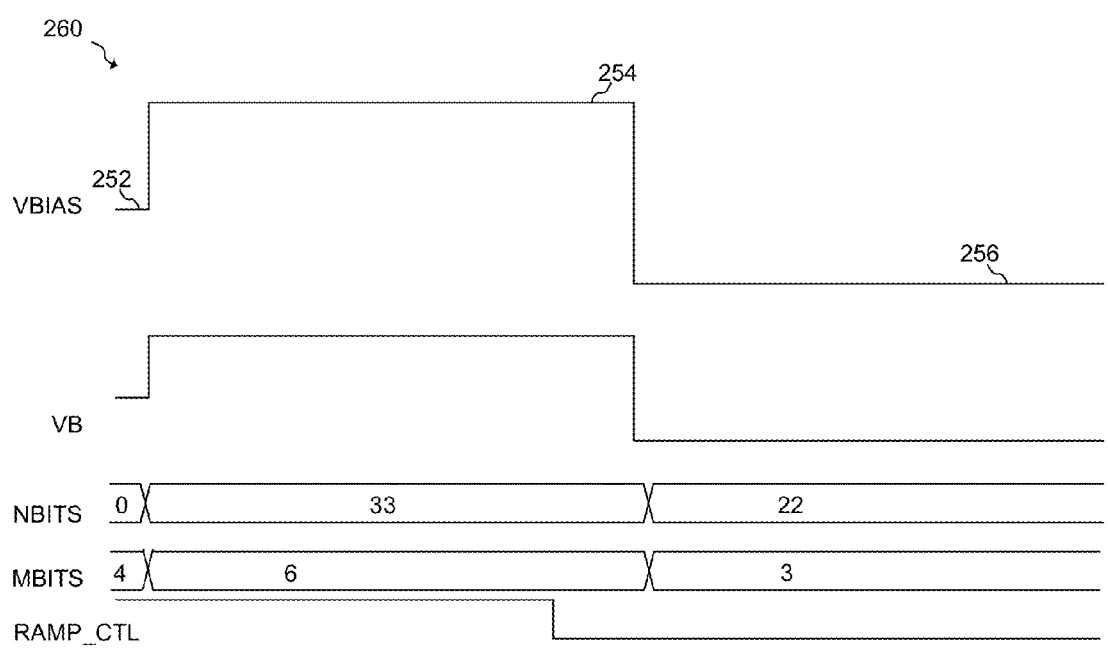

It should be appreciated that the example shown in waveform diagram 250 is just one of many different application examples. In alternative embodiments of the present invention, output voltage VBIAS may be controlled in a different manner. For example, in some embodiments a change of voltage of VBIAS may be obtained by directly without the use of up/down counter 232, in which case a change in output voltage may be effected in one or two steps instead of in multiple incremental steps as shown in waveform diagram 260 in FIG. 2c. In further embodiments, other step sizes may be used instead of a unity step size as illustrated in FIG. 2b.

Figure 3A:
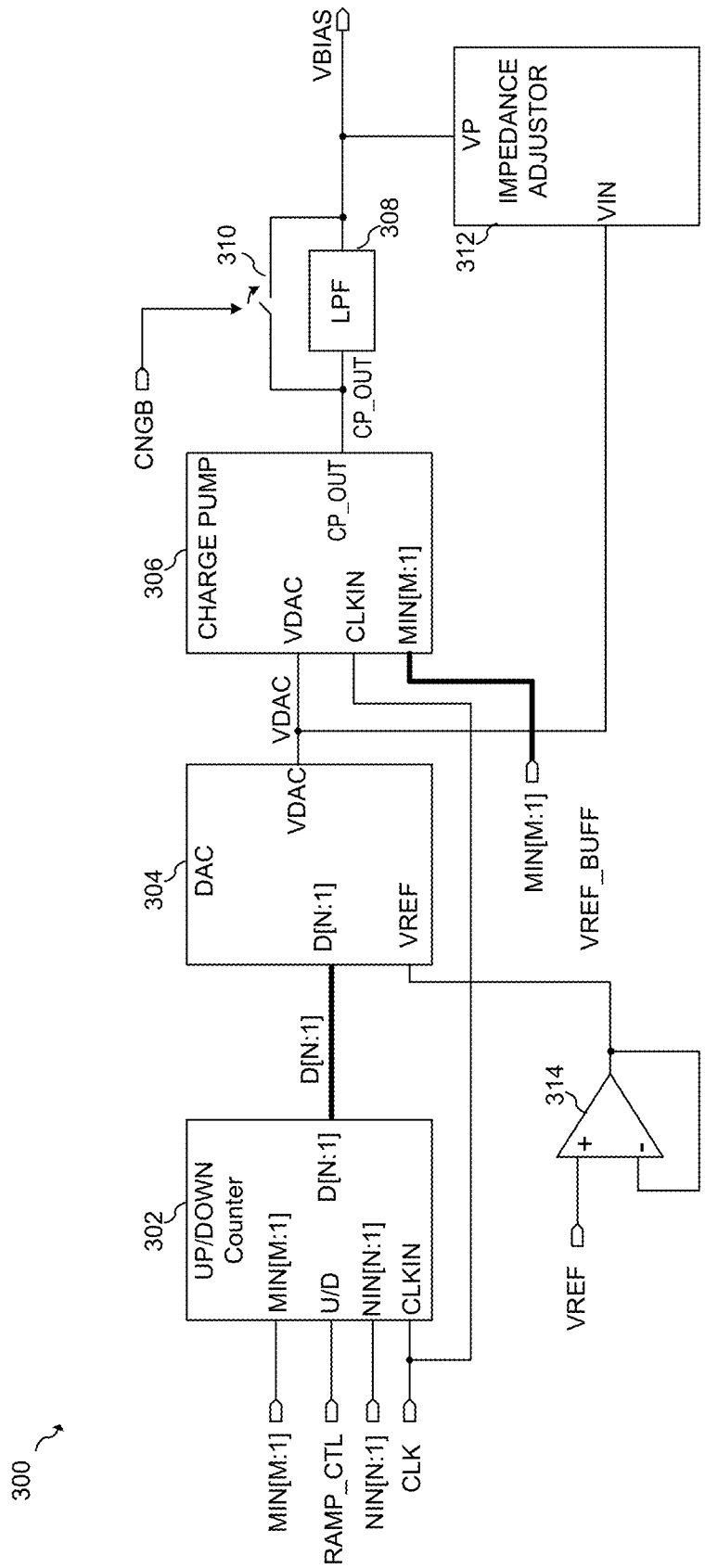
FIGS. 3a-h illustrate schematics of an embodiment voltage generator.

FIG. 3a illustrates voltage generation circuit 300 according to another embodiment of the present invention. Charge pump 306 produces voltage CP_OUT, which may be filtered by lowpass filter 308 to produce output voltage VBIAS. In some embodiments, signal CNGB activated switch 310, which bypasses lowpass filter 308. In some embodiments, lowpass filter 308 is bypassed at power-up or during a change of setting of output voltage VBIAS. Alternatively, lowpass filter 308 and/or switch 310 may be omitted.

In an embodiment, charge pump 306 produces output voltage CP_OUT which is adjustable in coarse steps with M-bit digital word MIN[M:1] and in fine steps via DAC 304 and DAC output voltage VDAC. DAC 304 produces voltage VDAC according to N-bit input word D[N:1]; however DAC 304 may produce an output current according to D[N:1] in alternative embodiments. Up/down counter 302 may be used to produce DAC input word D[N:1]. In some embodiments, up/down counter 302 may be omitted.

Amplifier 314 may be used to buffer voltage VREF to provide a reference voltage to DAC 304. In some embodiments, amplifier 314 provides a low impedance buffered voltage to DAC 304 and prevents switching noise in DAC 304 from affecting the reference generator that produces VREF. In alternative embodiments, amplifier 314 may be omitted.

Figure 3B:
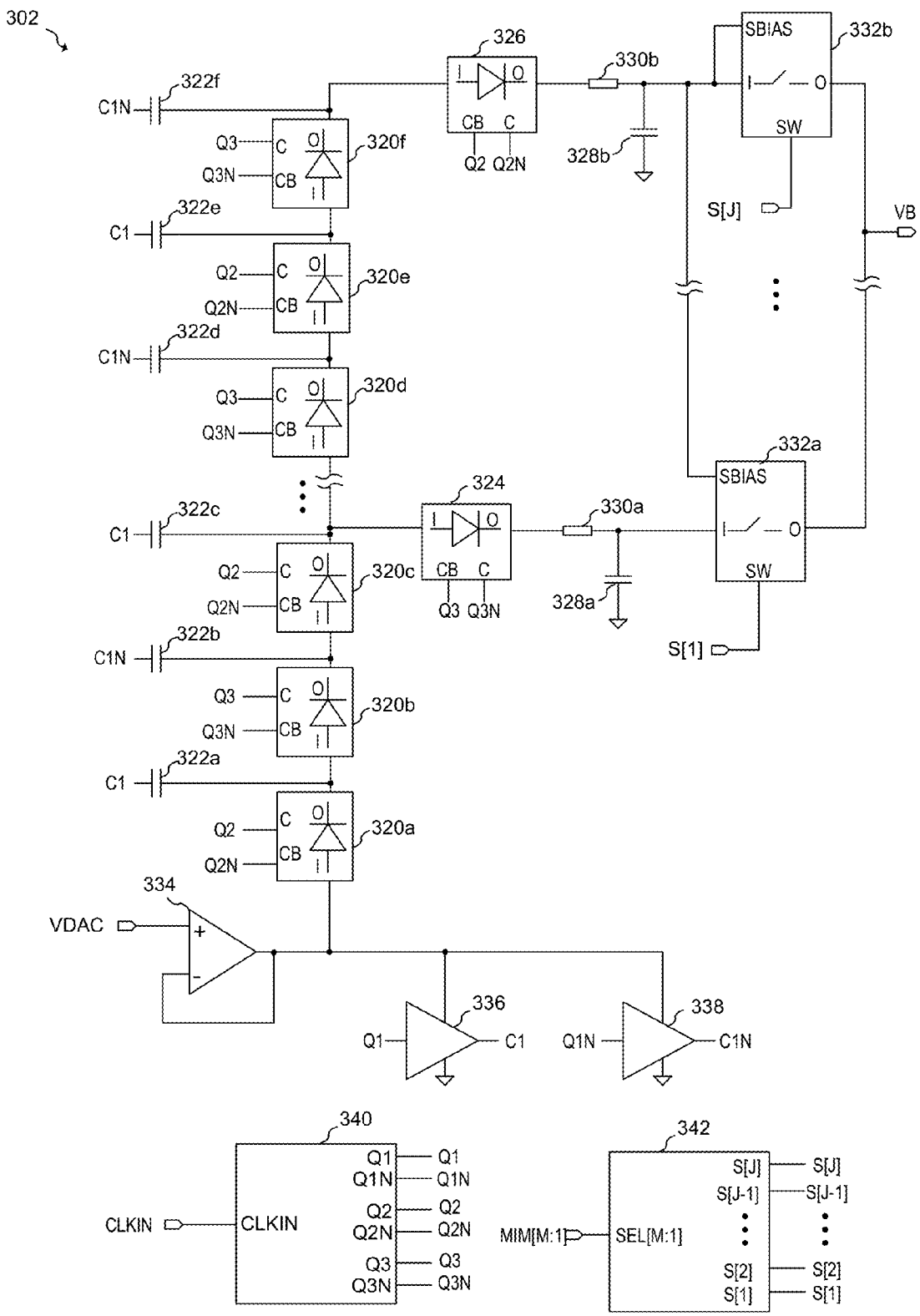

FIG. 3b illustrates a detailed schematic of charge pump 306 according to one embodiment of the present invention. Functional diode blocks 320a to 320f, are coupled to capacitors 322a to 322f, functional diode blocks 324 and 326 are coupled to a terminal of capacitors 322c and 322f, and to output switches 332a and 332b, respectively. Capacitors 322a to 322f may have capacitance values between about 500 fF and about 3 pF, depending on the particular application and its specifications; however, other values outside of this range may also be used. In some embodiments, the output of functional diode block 324 is filtered by a lowpass RC network that includes resistor 330a and capacitor 328a, and the output of functional diode block 326 is filtered by a lowpass RC network that includes resistor 330b and capacitor 328b. The corner frequency of these lowpass filters are set to about 15 KHz, however other corners frequencies may by used. Output switches may be activated by select signals S[1] to S[J], where J denotes the number of coupling branches. In an embodiment, select signals S[J:1] are produced by decoder 342 that decodes M-bit coarse adjustment word MIM[M:1]. While only two coupling branches are shown for simplicity of illustration, it should be understood that J may be any value. It should be further understood that while, only six capacitors and their corresponding switches are shown for simplicity of illustration, any number of charge pump capacitors and switches may be used. For example, in one embodiment, 12 switches, 12 capacitors and two output coupling branches are used.

In an embodiment, functional diode block 320a receives a reference voltage produced by voltage buffer 334, which also supplies clock buffers 336 and 338 with a supply voltage. In an embodiment, clock generator 340 produces clock signals Q1, Q1N, Q2, Q2N, Q3 and Q3N based on input clock signal CLKIN. These clock signals are used to drive functional diode blocks 320a to 320f, 324 and 326, as well as the inputs of clock buffers 336 and 338, the outputs of which drive terminals of capacitors 322a to 322f.

Figure 3C:
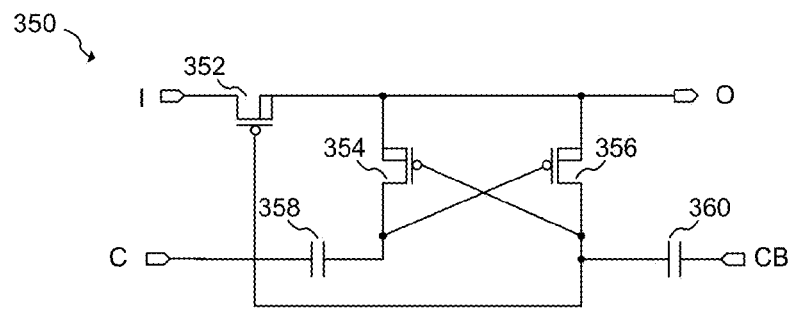

FIG. 3c illustrates embodiment functional diode block 350 which may be used to implement functional diode blocks 320a to 320f, 324 and 326 shown in FIG. 3b. Functional diode block 350 includes PMOS devices 352, 354 and 356 and input coupling capacitors 358 and 360. PMOS device 352 is a pass transistor that coupled input I of functional diode 350 to output O of functional diode 350. Cross coupled transistors 354 and 356 and input coupling capacitors 358 and 360 provide a boosted clock that shuts off transistor 352 at time during which the functional diode is in a non-conducting state. By using circuit 350, inefficiencies due to the threshold voltage of transistor 352 may be avoided. In alternative embodiments, a pn junction diode, a diode connected transistor, or other suitable device may be used in place of functional diode 350. It should be understood that FIG. 3c illustrates one example of a functional diode circuit. In alternative embodiments, other topologies may be used.

Figure 3D:
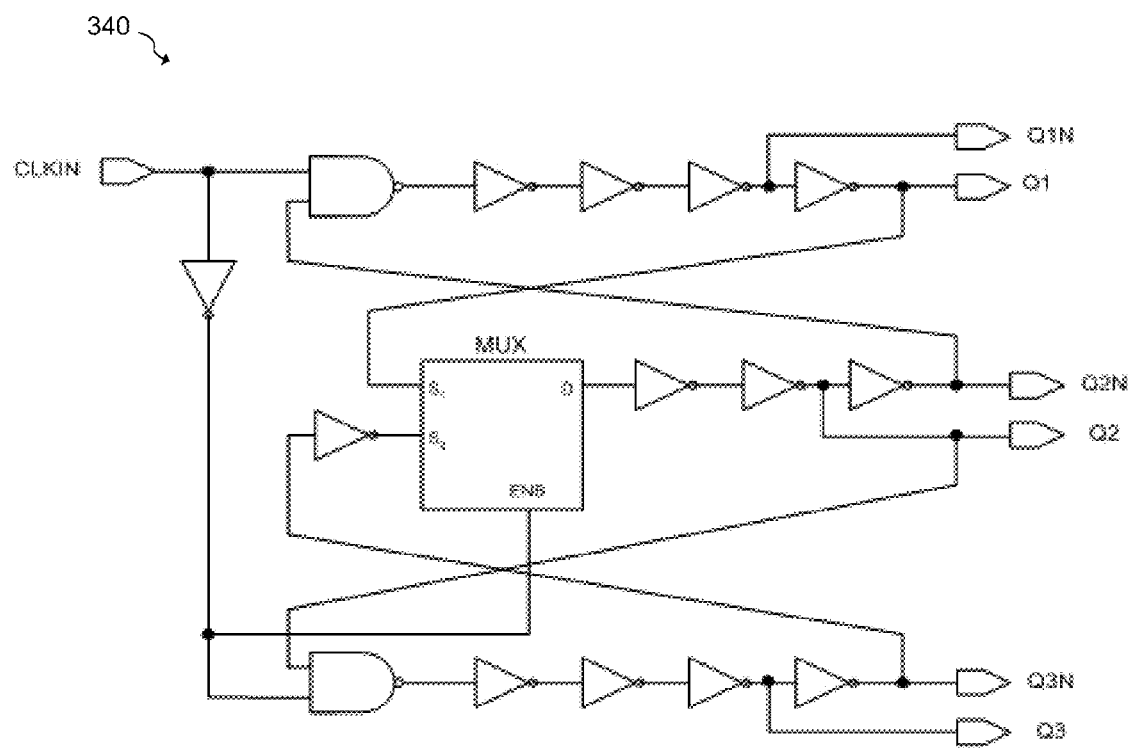
Figure 3E:
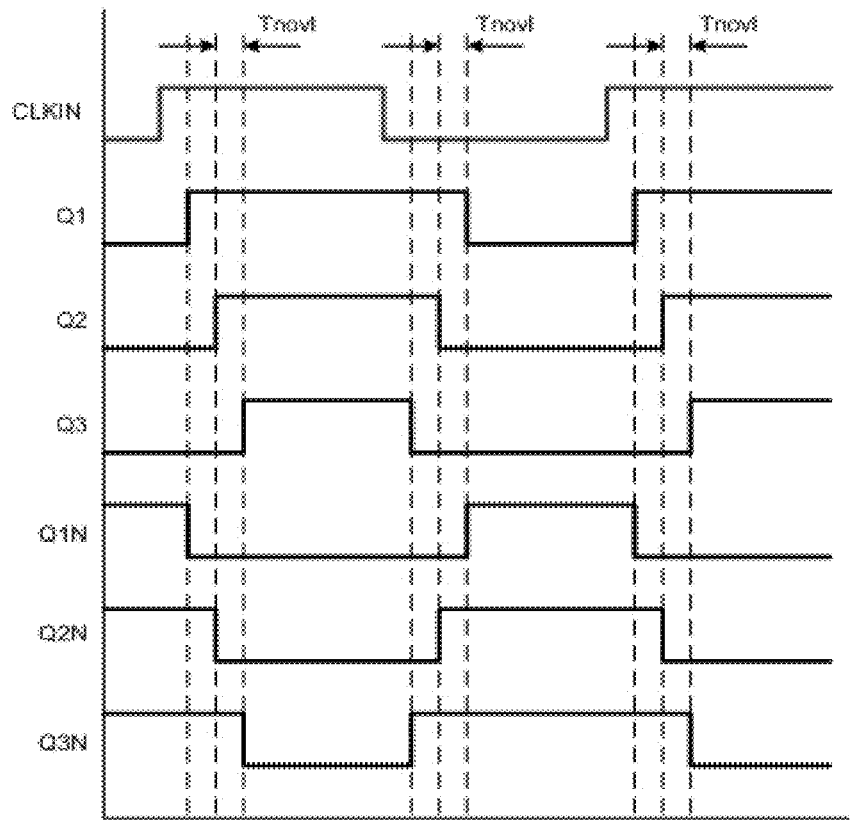

FIG. 3d illustrates a schematic of embodiment clock generator 340, which provides phased clocks for capacitors 322a to 322f, and functional diodes 320a to 320f, 324 and 326. FIG. 3e illustrates a timing diagram of clock generator 340. In an embodiment, clock signals Q1 and Q1N that drive clock buffers 336 and 338 have the widest pulse width, clock signals Q2 and Q2N that drive some of the functional diodes have a narrower pulse width, and clock signals Q3 and Q3 that drive the remaining functional diodes have the narrowest pulse width. In an embodiment, the rising edge of Q2 with respect to Q1, the falling edge of Q1 with respect to Q2, the rising edge of Q3 with respect to Q2 and the falling edge of Q2 with respect to Q3 is delayed by Tnovl. By using an embodiment clock phasing scheme, such as the one illustrated in FIG. 3e, the functional diodes are in a stable before the signals driving capacitors 322a to 322f change state. In alternative embodiments, other clock phase relationships may be used.

Figure 3F:
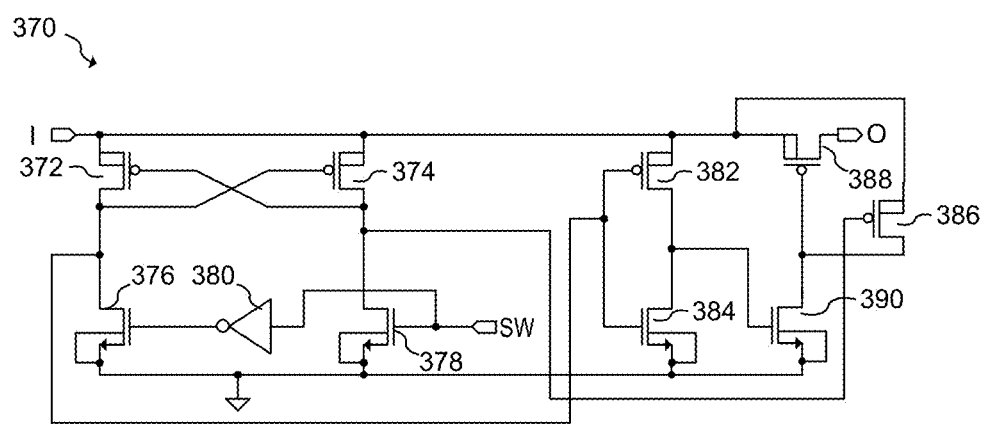

FIG. 3f illustrates embodiment output switch 370 that may be used, for example, to implement output switches 332a and 332b shown in FIG. 3b. Output switch 370 includes a level shifting circuit made up of PMOS transistors 372 and 374, NMOS transistors 376 and 378, and inverter 380 that converts standard logic level signal SW to higher logic levels needed to operate switch 370. In an embodiment, outputs of the level shifter are used to drive PMOS transistor 382 and NMOS transistor 384, which are arranged in an inverter configuration, and PMOS transistor 386. When switch 370 is ON, PMOS transistor 388 is pulled low by NMOS transistor 390, thereby creating a low impedance path between nodes I and O. When switch 370 is OFF, PMOS transistor 386 pulls the gate of PMOS 388 high by PMOS transistor 386. It should be understood that output switch 370, as illustrated in FIG. 3f, is just one example of an output switching circuit. In alternative embodiments of the present invention, other circuit topologies may be used to implement a switch.

Figure 3G:
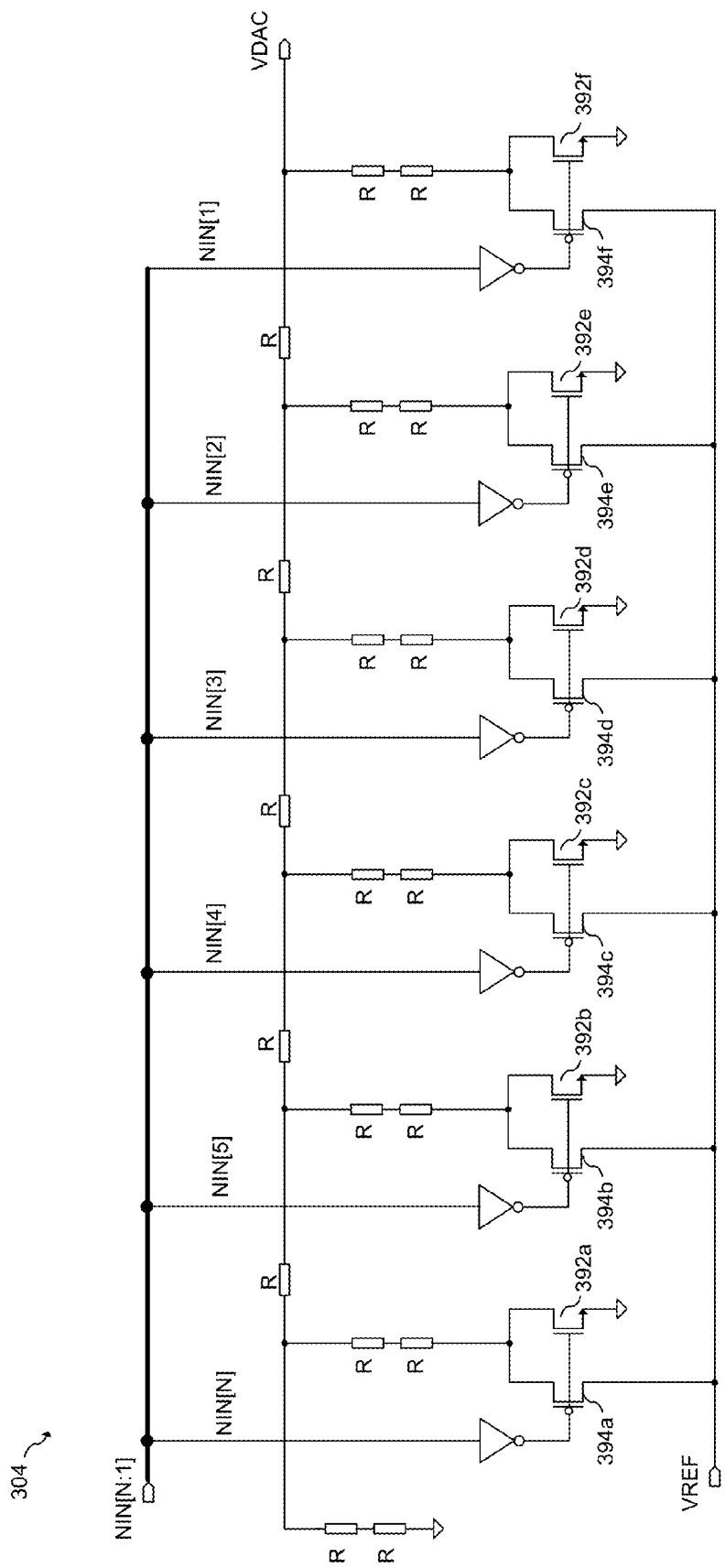

FIG. 3g illustrates an embodiment implementation of DAC 304. In an embodiment, deck 304 is implemented as a 6 bit R-2R based DAC. PMOS switching transistors 394a to 394f and NMOS switching transistors 392a to 392f selectively couple resistors within an R-2R ladder to reference voltage VREF or to ground according to N-bit input word NIN[N:1], where N=6. Alternatively, other bit widths may be used for NIN. In an embodiment, the value of R is about 100 KΩ; however, other resistance values may be used. The output of the DAC is taken at node VDAC. It should be understood that DAC 304 illustrated in FIG. 3g is one example of an embodiment DAC implementation. In alternative embodiments of the present invention other circuits and DAC topologies may be used.

Figure 3H:
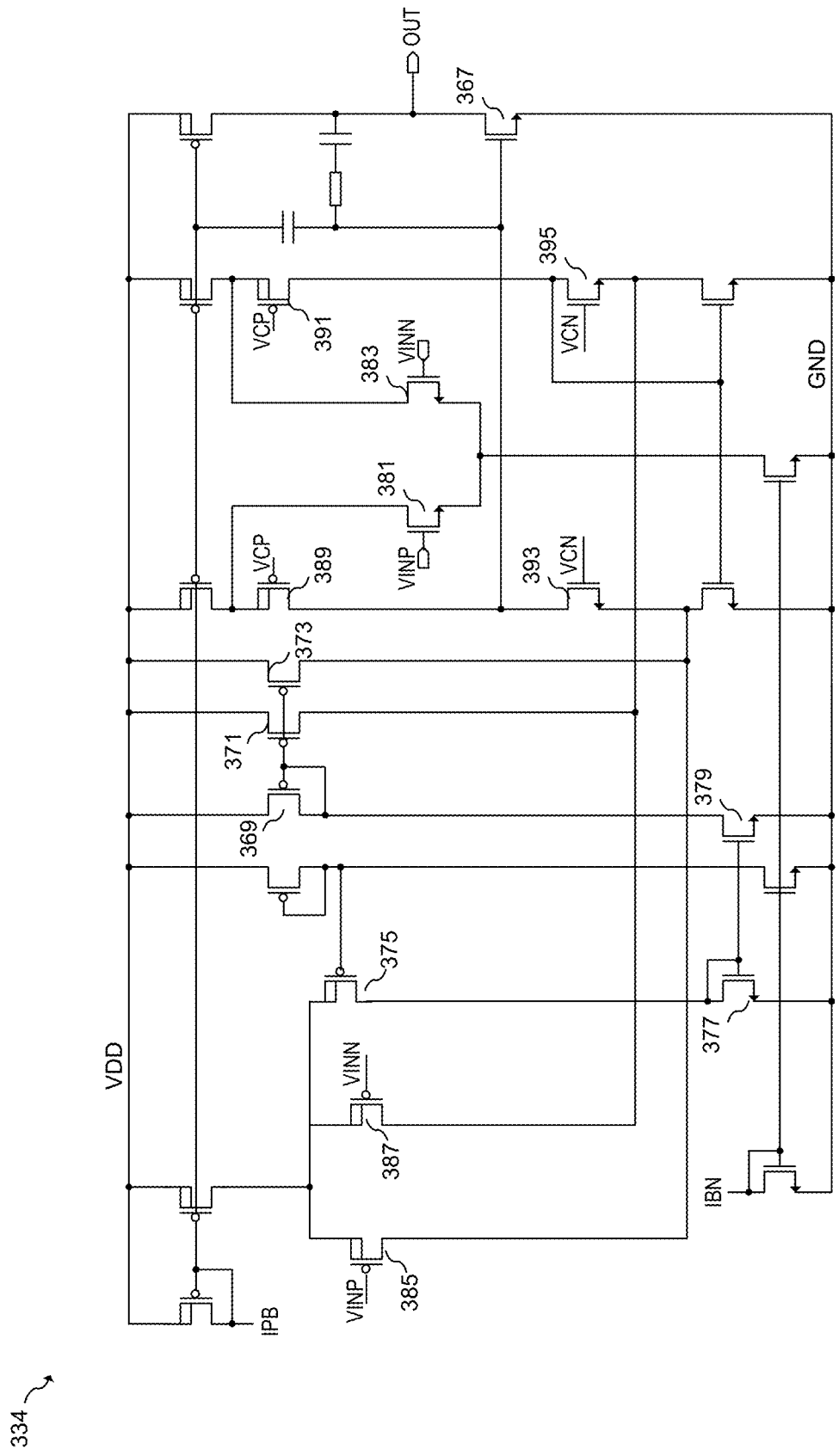

FIG. 3h illustrates embodiment rail to rail operational amplifier 334 that may be used to implement voltage buffer 334 shown in FIG. 3b as well as voltage buffer 228 shown in FIG. 2a. Amplifier 334 has two input differential pairs including NMOS differential pair made of NMOS transistors 381 and 383, and a PMOS differential pair made of PMOS transistors 385 and 387. The outputs of the NMOS differential pair are coupled to folded cascode PMOS transistors 389 and 391, and the outputs of the PMOS differential pair are coupled to folded cascode transistors 393 and 395. PMOS transistor 375 controls the amount of signal current coupled into folded cascode NMOS transistors 393 and 395. For example, when the input common mode voltage of inputs VINP and VINN approach one PMOS threshold below the power supply, PMOS transistor 375 diverts bias current away from PMOS transistors 385 and 387, and mirrors this diverted current to folded cascode NMOS transistors 393 and 395 via current mirror transistors 377, 379, 369, 371, and 373. NMOS output transistor 367 is coupled to the drains of PMOS transistor 389 and NMOS transistor 393. It should be understood that circuit 334 shown in FIG. 3h is just one example of many possible circuits that may be used to implement this DAC output buffer. In alternative embodiments of the present invention, other circuit topologies may be used. For example, in some embodiments, a simpler structure may be used if rail to rail operation is not required.

Figure 4C:
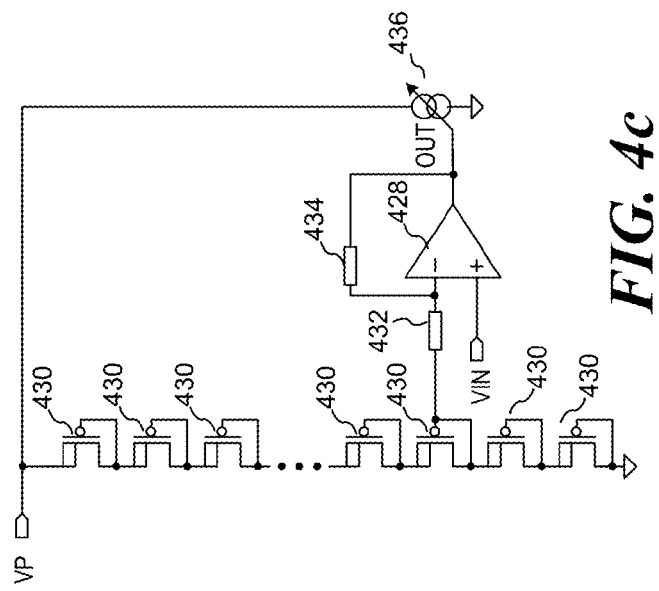
FIGS. 4a-c illustrate various embodiment implementations of an impedance adjustment circuit.
Figure 4A:
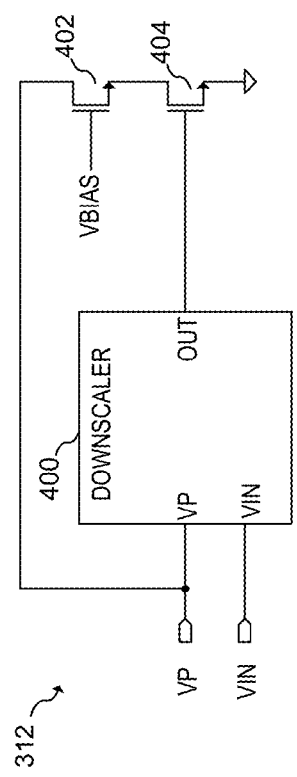
Figure 4B:
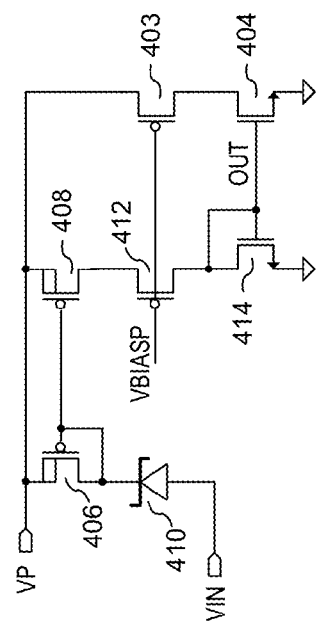

FIG. 4a illustrates impedance adjustment circuit that may be used, for example, to implement impedance adjustment circuit 312 illustrated in FIG. 3a. In an embodiment, impedance adjustment circuit 312 includes downscaler 400, and a current source including cascode transistor 402 and current mirror transistor 404. In an embodiment, downscaler produces a downscaled voltage at node OUT that is proportional to a voltage difference between input node VP and input node VIN. FIGS. 4b-c illustrate other embodiment impedance adjustment circuits.

FIG. 4b illustrates an embodiment impedance adjustment circuit including PMOS transistors 403, 406, 408 and 412, zener diode 410, and NMOS transistor 404. In an embodiment, current mirror PMOS transistor 408 produces a current proportional to a voltage difference between nodes VP and VIN, as applied across zener diode 410 and diode connected PMOS transistor 406. This proportional current passes through PMOS cascode transistor 412 and is mirrored back to VP via current mirror NMOS devices 414 and 404 and though PMOS output transistor 403.

FIG. 4c illustrates an impedance adjustment circuit according to another embodiment that uses a plurality of series coupled diode connected PMOS transistors 430, one node of which is coupled to amplifier 428. The output of amplifier 428 is coupled to controlled current source 436. In an embodiment, amplifier 428 is implemented as an operational amplifier in an inverting feedback configuration coupled to feedback resistor 434 and series input resistor 432. In one embodiment, the closed loop gain of amplifier 428 and associated feedback resistors is between about 1 MΩ and about 10 MΩ. However, in alternative embodiments, other amplifier and feedback topologies and other gains may be used depending on the particular application and its specifications. In some embodiments, PMOS transistors 430 may be implemented, for example, using high voltage PMOS devices or low voltage PMOS devices disposed in high voltage n-wells. It should be understood that the circuits of FIGS. 4a-c are just two examples of embodiment impedance adjustment circuits. In alternative embodiments of the present invention, other circuit topologies may be used.

In accordance with an embodiment, a method of operating a charge pump includes providing a first programmable voltage to a plurality of clock generators having outputs coupled to first nodes of corresponding groups of charge pump capacitors. The clock generators produce a plurality of clock signals having amplitudes proportional to the first programmable voltage. The method further includes selecting a second node of one capacitor from one of the corresponding groups of charge pump capacitors and coupling the selected second node to an output of the charge pump.

In some embodiments, providing the first programmable voltage includes coupling an output of a digital to analog (D/A) converter to the first nodes of the corresponding groups of charge pump capacitors. In an embodiment, providing the first programmable voltage controls an output voltage of the charge pump according to a first voltage granularity, selecting the second node of the one capacitor controls the output voltage of the charge pump according to a second voltage granularity, and the second voltage granularity is more coarse than the first voltage granularity.

In an embodiment, the method may further include adjusting an output impedance of the charge pump, wherein adjusting the output impedance of the charge pump further adjusts an output voltage of the charge pump. Adjusting the output impedance of the charge pump may also include adjusting a current of a current source coupled to the output of the charge pump. In some embodiments, adjusting the current source includes adjusting the current according to a difference between a voltage proportional to the output voltage of the charge pump and the first programmable voltage.

In an embodiment, the method further includes coupling the output voltage of the charge pump to a bias terminal of a capacitive signal source, which may include a MEMS microphone.

In accordance with another embodiment, a programmable voltage source includes a programmable voltage generator producing a first voltage at an output node, and a multi-stage charge pump that include a first and a second clock generator, a first and a second group of capacitors, output coupling switches, and an output switch controller. The first clock generator is coupled to the programmable voltage generator, and is configured to generate a first clock signal having an amplitude proportional to the first voltage. The second clock generator is coupled to the programmable voltage generator and is configured to generate a second clock signal having an amplitude proportional to the first voltage. The first group of capacitors has a first node coupled to the first clock signal and the second group of capacitors have a first node coupled to the second clock signal. Furthermore, the output coupling switches are coupled between second nodes of capacitors of the first and second group of capacitors and an output of the programmable voltage source. The output switch controller configured to activate one of the output coupling switches.

In an embodiment, wherein the programmable voltage generator includes a digital to analog (D/A) converter. In some embodiments, stages of the multi-stage charge pump comprises a functional diode coupled between two capacitors. The functional diode may be implemented using, for example MOS pass transistor. In some embodiments, the multi-stage charge pump includes a Dickson charge pump. In an embodiment, the programmable voltage generator also includes a decoder coupled to between a coarse digital input and control nodes of the selectable switches.

In some embodiments, the programmable voltage generator also includes a controllable current source coupled to the output node of the programmable voltage source, and a current control circuit coupled to a control node of the controllable current source. The current control circuit may adjust the controllable current source based on a voltage at the output of the programmable voltage source and the first voltage. In some embodiments, the current control circuit includes a voltage downscaler having an input coupled to the output of the programmable voltage source, and an error amplifier having a first input coupled to an output of the voltage downscaler, a second input coupled to the first voltage, and an output coupled to the control node of the controllable current source.

In an embodiment, the programmable voltage generator provides fine control of a voltage at the output of the programmable current source, and the output coupling switches provides coarse control of the voltage at the output of the programmable current source.

In accordance with a further embodiment, a programmable voltage source includes a digital to analog (D/A) converter, and a plurality of clock generators coupled to an output of the D/A converter. The plurality of clock generators are configured to produce a clock signal having an amplitude proportional to a first signal at the output of the D/A converter. The programmable voltage source also includes a multi-stage charge pump coupled to the plurality of clock generators, a switching network, and a switching network controller. The multi-stage charge pump produces an output voltage proportional to the first signal, and each switch of the switching network includes a first end coupled to a corresponding capacitor within the multi-stage charge pump, and a second end coupled to an output node of the programmable voltage source. In an embodiment, the switching network controller is configured to activate a switch of the switching network. In some embodiments, the multi-stage charge pump includes a Dickson charge pump. The programmable voltage source may be disposed on an integrated circuit, and the system may further include a MEMS microphone coupled to an output of the programmable voltage source.

In an embodiment, the D/A converter includes an input coupled to a first digital input bus, where the first digital input bus provides fine control of a voltage at the output node of the programmable voltage source. Furthermore, the switching network may include an input coupled to a second digital input bus, where the second digital input bus provides coarse control of the voltage at the output node of the programmable voltage source.

In an embodiment, the system also includes a controllable current source coupled to the output node of the programmable voltage source, and a current control circuit coupled to a control node of the controllable current source. The current control circuit may adjust the controllable current source based on a voltage at the output of the programmable voltage source and the first signal. In some embodiments, the system further includes an up/down counter coupled to an input of the D/A.

An advantage of embodiment systems that provide fine voltage control of a charge pump, includes the ability to provide accurate gain control via the bias voltage of a MEMS microphone. A further advantage includes the ability to adjust the gain of a MEMS microphone or a capacitive sensor without changing the load seen by the MEMS microphone or the capacitive sensor.

A further advantage of some embodiments implementations that are directed toward MEMS devices includes the ability to adjust the sensitivity in the tuning process of MEMS microphone or capacitive sensor at final test in fab with respect to optimizing SNR. By doing this, the statistical process spread of microphone sensitivity is reduced, thereby increasing the yield of the MEMS device.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a charge pump, the method comprising:
   providing a first programmable voltage to a plurality of clock generators having outputs coupled to first nodes of corresponding groups of charge pump capacitors, the clock generators producing a plurality of clock signals having amplitudes proportional to the first programmable voltage;
   selecting a second node of one capacitor from one of the corresponding groups of charge pump capacitors;
   coupling the selected second node to an output of the charge pump; and
   adjusting an output impedance of the charge pump, wherein adjusting the output impedance of the charge pump further adjusts an output voltage of the charge pump, and adjusting the output impedance of the charge pump comprises adjusting a current of a current source coupled to the output of the charge pump.

2. The method of claim 1, wherein providing the first programmable voltage comprises coupling an output of a digital to analog (D/A) converter to the first nodes of the corresponding groups of charge pump capacitors.

3. The method of claim 1, wherein:
   providing the first programmable voltage controls an output voltage of the charge pump according to a first voltage granularity; and
   selecting the second node of the one capacitor controls the output voltage of the charge pump according to a second voltage granularity, wherein the second voltage granularity is more coarse than the first voltage granularity.

4. The method of claim 1, wherein adjusting the current source comprises adjusting the current according to a difference between a voltage proportional to the output voltage of the charge pump and the first programmable voltage.

5. The method of claim 1, further comprising:
   coupling the output of the charge pump to a bias terminal of a capacitive signal source.

6. The method of claim 5, wherein the capacitive signal source comprises a MEMS microphone.

7. A programmable voltage source comprising:
   a programmable voltage generator producing a first voltage at an output node;
   a multi-stage charge pump, the multi-stage charge pump comprising:
      a first clock generator coupled to the programmable voltage generator, wherein the first clock generator is configured to generate a first clock signal having an amplitude proportional to the first voltage;
      a second clock generator coupled to the programmable voltage generator, wherein the second clock generator is configured to generate a second clock signal having an amplitude proportional to the first voltage;
      a first group of capacitors having a first node coupled to the first clock signal;
      a second group of capacitors having a first node coupled to the second clock signal;
      output coupling switches coupled between second nodes of capacitors of the first and second group of capacitors and an output of the programmable voltage source; and
      an output switch controller configured to activate one of the output coupling switches.

8. The programmable voltage source of claim 7, wherein the programmable voltage generator comprises a digital to analog (D/A) converter.

9. The programmable voltage source of claim 7, wherein stages of the multi-stage charge pump comprises a functional diode coupled between two capacitors.

10. The programmable voltage source of claim 9, wherein the functional diode is a MOS pass transistor.

11. The programmable voltage source of claim 7, wherein the multi-stage charge pump comprises a Dickson charge pump.

12. The programmable voltage source of claim 7, further comprising a decoder coupled to between a coarse digital input and control nodes of the output coupling switches.

13. The programmable voltage source of claim 7, further comprising:
   a controllable current source coupled to the output of the programmable voltage source; and
   a current control circuit coupled to a control node of the controllable current source, the current control circuit adjusting the controllable current source based on a voltage at the output of the programmable voltage source and the first voltage.

14. The programmable voltage source of claim 13, wherein the current control circuit comprises:
   a voltage downscaler having an input coupled to the output of the programmable voltage source; and
   an error amplifier having a first input coupled to an output of the voltage downscaler, a second input coupled to the first voltage, and an output coupled to the control node of the controllable current source.

15. The programmable voltage source of claim 7, wherein:
   the programmable voltage generator provides fine control of a voltage at the output of the programmable voltage source; and
   the output coupling switches provides coarse control of the voltage at the output of the programmable voltage source.

16. A system comprising:
   a programmable voltage source comprising
      a digital to analog (D/A) converter;
      a plurality of clock generators coupled to an output of the D/A converter, the plurality of clock generators configured to produce a clock signal having an amplitude proportional to a first signal at the output of the D/A converter;
      a multi-stage charge pump coupled to the plurality of clock generators, the multi-stage charge pump producing an output voltage proportional to the first signal;
      a switching network comprising switches, wherein each switch of the switching network comprises a first end coupled to a corresponding capacitor within the multi-stage charge pump, and a second end coupled to an output node of the programmable voltage source;
      a switching network controller configured to activate a switch of the switching network;
      a controllable current source coupled to the output node of the programmable voltage source; and
      a current control circuit coupled to a control node of the controllable current source, the current control circuit adjusting the controllable current source based on a voltage at the output of the programmable voltage source and the first signal.

17. The system of claim 16, further comprising an up/down counter coupled to an input of the D/A converter.

18. The system of claim 16, wherein the multi-stage charge pump comprises a Dickson charge pump.

19. The system of claim 16, wherein the programmable voltage source is disposed on an integrated circuit.

20. The system of claim 16, further comprising a MEMS microphone coupled to an output of the programmable voltage source.

21. The system of claim 16, wherein:
- the D/A converter comprises an input coupled to a first digital input bus, the first digital input bus providing fine control of a voltage at the output node of the programmable voltage source; and
- the switching network comprises an input coupled to a second digital input bus, the second digital input bus providing coarse control of the voltage at the output node of the programmable voltage source.

\* \* \* \* \*